United States Patent [19]
Shelton

[11] 4,028,008
[45] June 7, 1977

[54] SOLAR ENERGY OPERATED AIR COMPRESSOR

[76] Inventor: Herbert P. Shelton, 4832 Martin St., Alexandria, Va. 22312

[22] Filed: June 18, 1976

[21] Appl. No.: 697,417

[52] U.S. Cl. .................................. 417/52; 126/270; 126/271; 417/207; 417/243; 417/244; 417/251
[51] Int. Cl.² ........................................ F04B 19/24
[58] Field of Search ............ 417/52, 53, 207, 349, 417/379, 243, 244, 248, 251, 313, 321; 60/641, 650, 682; 290/2; 126/270, 271

[56] References Cited

UNITED STATES PATENTS

| 2,636,129 | 4/1953 | Agnew | 290/2 |
|---|---|---|---|
| 2,688,923 | 9/1954 | Bonaventura et al. | 417/379 |
| 3,195,806 | 7/1965 | Bowen et al. | 417/52 |
| 3,659,960 | 5/1972 | Dunlop | 417/52 X |

FOREIGN PATENTS OR APPLICATIONS

| 285,775 | 2/1928 | United Kingdom | 417/52 |

Primary Examiner—William L. Freeh
Assistant Examiner—Edward Look
Attorney, Agent, or Firm—Robert D. Farkas

[57] ABSTRACT

This disclosure pertains to tanks, operated in pairs disposed above the surface of the earth. Each is adapted with sunshading deflectors selectively operated so as to permit the air contained within one such tank to be heated and thus elevated in pressure, by the rays of the sun. A receiving tank, disposed below the surface of the earth, collects the pressurized air and enables the cooling thereof. Condensation occurs while the pressure level within the receiving tank is elevated. A plurality of such units comprising above ground pairs of tanks and below ground cooled receiving tanks are arranged in a series circuit so as to increase the available air pressure at the last receiving tank. A centralized condensate tank collects all the water condensed within each receiving tank and utilizes the elevated air pressure therewithin to discharge the water as required. The air pressure at the last receiving tank may be utilized to drive a motor which in turn can operate an electric generator.

9 Claims, 3 Drawing Figures

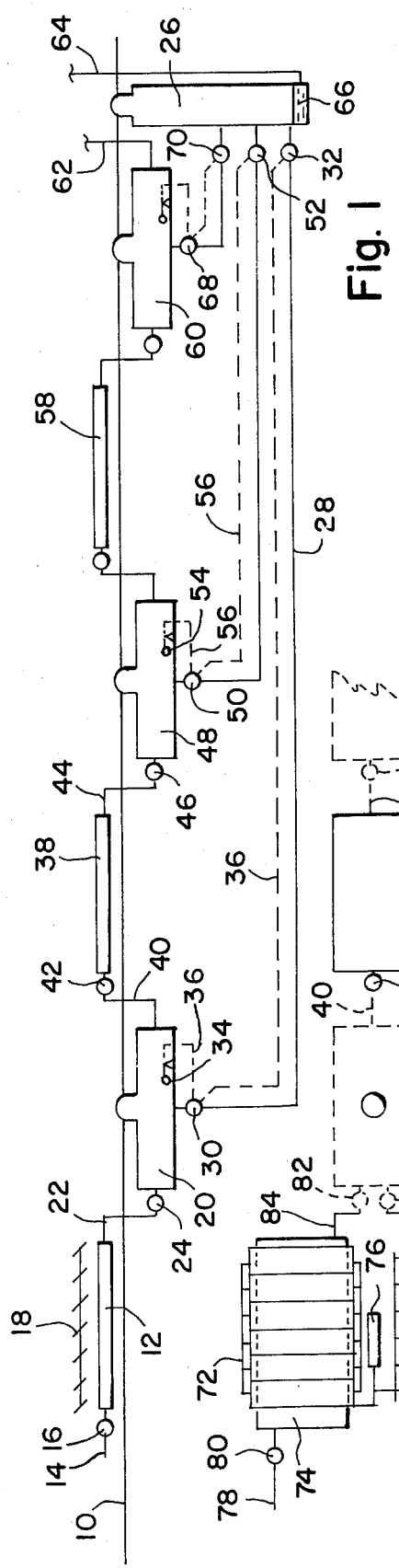
Fig. 1
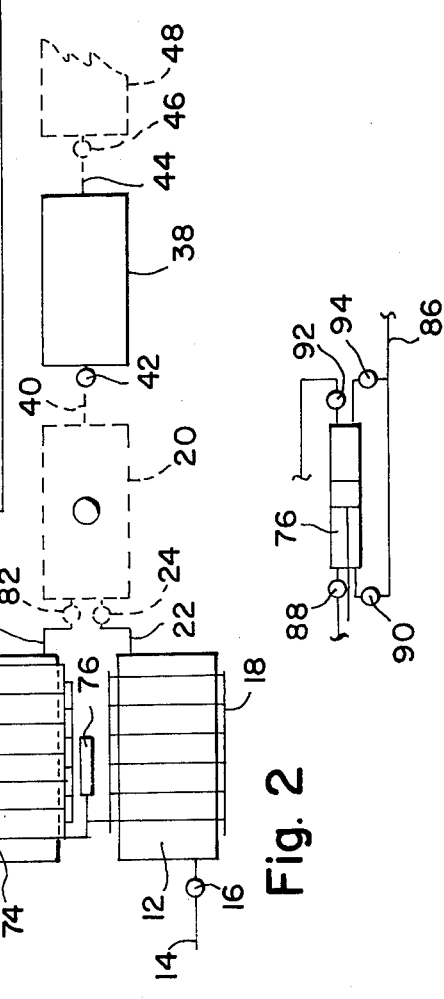
Fig. 2
Fig. 3

SOLAR ENERGY OPERATED AIR COMPRESSOR

BACKGROUND OF THE INVENTION

1. The Field of the Invention

This invention relates to solar energy conversion units and more particularly to that class generating compressed air and providing captures condensed moisture from within the air.

2. Description of the Prior Art

The prior art abounds with solar energy power plants. U.S. Pat. No. 3,070,703 issued on Dec. 25, 1962 to W.H. Podolny teaches a solar energy absorber utilized to operate a boiler which in turn operates a turbine driven electric generator. The generator provides electrical power to an electrolysis tank whose outputs supply gaseous oxygen and hydrogen, which may be stored separately in tanks. When desired, the oxygen and hydrogen is fed to a fuel cell which provides electrical energy.

U.S. Pat. No. 2,942,411 issued on June 28, 1960 to LeRoi E. Hutchings discloses a solar energy operated boiler providing high pressure stream which in turn operates a tubine and a gas compressor providing compressed air outputs and a condensate output which in turn fills a water reservoir used to provide water makeup to the solar boilder. The air pressure is stored at low and high pressure levels within the storage tanks each being used to provide motive power to a motor driven electric generator.

Each of the aforementioned Patents suffer from the common deficiency of utilizing a quantity of diverse apparatus each changing the state of the medium of stored energy and each changing the type of energy from the point at which energy conversion occurs at the solar heated apparatus to the point within the apparatus that energy is stored.

SUMMARY OF THE INVENTION

A primary object of the present invention is to provide a solar energy operated energy producing device which simply converts solar energy to compressed air, thereby maximizing the efficient production of the compressed air.

Another object of the present invention is to provide an energy accumulating device which is simple in form and is virtually maintenance free.

Still another object of the present invention is to provide a solar energy operated power source which yields condensed water as a by-product thereby increasing the usefulness thereof in climates devoid of local water sources.

Two basic difficulties have plagued solar energy driven power sources available in the prior art. The captured solar energy, in whatever form, must be conveniently and economically stored for long periods of time so as to enable the stored energy to be utilized on demand during hours of darkness and during those periods of time when heating rays of the sun are not available, such as during overcast days. The other major problem plaguing efficient power generating devices is the number of times the absorbed heat energy is converted from one form of energy to another including the form of energy employed during storage. Each time such an energy type transformation takes place the overall efficiency of the apparatus decreases.

The present invention overcomes these objections by capturing quantities of air within surface mounted tanks and, by utilizing the heat in the sun's rays, increasing the pressure therein for storage in receiving tanks disposed below the surface of the earth, wherein cooling occurs. Since the energy source, available from the receiving tanks is ultimately utilized to either operate an air motor or as a power generating device utilizing the refrigeration effect such as is produced by expanding compressed air, a minimum number of energy converting steps occurs, resulting in a high efficiency, further enhanced by the temperature differential due to the location of the above grade tanks and the below grade tanks. Condensed water, a by-product of the cooling step, is a bonus available for consumption purposes, or if desired, for enhancing cooling of the below ground receiving tanks.

These objects, as well as other objects of the present invention, will become more readily apparent after reading the following description of the accompanying drawings.

BRIEF DESCRIPTION OF THE DRAWINGS

FIG. 1 is a side elevation view of the various components electrically pneumatically and hydraulically interconnected as utilized by the present invention.

FIG. 2 is a plan view of some of the components shown in FIG. 1.

FIG. 3 is a pneumatic schematic of a piston apparatus as shown in FIG. 2.

DESCRIPTION OF THE PREFERRED EMBODIMENT

The structure and method of fabrication of the present invention is applicable to a pair of first above ground intake tanks mounted above the surface of the earth and exposed to the rays of the sun. Each of the intake tanks are covered by movable louvres, which when closed, shield the tank associated therewith from the rays of the sun. Each input tank is vented to the atmosphere by way of a check valve. A piston, operated by compressed air, selectively and alternatively opens and closes the louvres on the pair of input tanks so that one tank is always shielded from the sun's rays. Each of the input tanks communicates to a first receiving tank buried below the earth's surface, utilizing individual check valves in the communicating piping. Thus, when air within any single tank equals or exceeds the pressure within the first receiving tank, the compressed air equalizes to the pressure within the receiving tank. The size of the input tanks and the size of the first receiving tank are judiciously selected so that the first receiving tank stores substantial volumes of compressed air utilizing the following equation:

$$PV = kRT$$

wherein $P$ equals the pressure, $V$ equals the volume, $T$ equals the temperature, and $k$ and $R$ being constants. The electrical equivalent circuit is a pair of small capacitors each utilizing switches to selectively charge, when their respective switches are closed, a large capacitor, and where each small capacitor gradually assumes a charge from a common voltage source, in this case the sun, utilizing series resistors, so as to permit the gradual charge of the small capacitors.

The first receiving tank, has a water line connected at the base thereof, fluidly communicating to a main condensate tank. A motorized water valve, operated by a float switch within the first receiving tank, opens up the piping connecting the first receiving tank and the condensate tank when the water level therein exceeds a pre-determined level.

The first receiving tank has an output port fluidly communicating to another above grade mounted tank, which is utilized to heat the now cooled output of the first receiving tank due to the exposure to the sun's rays. A check valve is installed in the piping connecting the first receiving tank and the above grade heating tank, so as to prevent high pressure heated air, generated within the heated tank, to re-enter the first receiving tank. The heating tank is in turn connected to subsequent receiving tanks, each having other heating tanks interposed there-in-between, culminating in a final receiving tank at which substantial volumes of high pressure compressed air may be stored until such time that it is needed.

A piston is mechanically linked to the louvre assemblied above each input tank and is operated by compressed air, derived from within the system, and controlled by solenoid valves which electrically operate each time the check valves interposed between the pair of input tanks are opened.

Now referring to the Figures, and more particularly to the embodiment illustrated in FIG. 1 showing a line 10 representing the grade level of the earth. Input tank 12 is vented to the atmosphere at point 14, having check valve 16 interposed there-in-between so as to prevent air at a higher pressure level then atmospheric, within tank 12, from being discharged into the atmosphere. Louvres 18 selectively shield input tank 12 from the rays of the sun, when closed. An underground receiving tank 20 communicates with input tank 12 by way of pipe 22 and check valve 24. Check valve 24 opens when the pressure in input tank 12 exceeds the pressure within receiving tank 20. Condensate tank 26 is coupled to receiving tank 20 by way of drain line 28, having water valves 30 and 32 interposed there-in-between. When the water level within receiving tank 20, reaches a pre-determined height, float switch 34 is operated, causing electrical lines 36 to energize water valves 30 and 32 so that accumulated condensed moisture within receiving tank 20 is stored within condensate tank 26. Heating tank 38, mounted above grade line 10, is coupled to receiving tank 20 by way of pipe 40 and check valve 42. Check valve 42 permits high pressure air from receiving tank 20 to enter heating tank 38 only when the pressure level therewithin is below that of receiving tank 20. Pipe 44, having check valve 46 connected thereto is utilized to communicate high pressure gas from heating tank 38 to receiving tank 48. Water valves 50 and 52 are utilized in similar fashion to water vavles 30 and 32 as is float switch 54 and electrical lines 56. In like fashion to heating tank 38, heating tank 58 and receiving tank 60 continue to accumulate increased volumes an increased pressure levels of air therein. Pipe 62 is utilized as an off-bear for the final receiving tank 60, as is pipe 64 being utilized as an offbear for the condensate water 66 accumulated within condensate tank 26. Both receiving tank 60 and condensate tank 26 are utilized to store the compressed air at its highest pressure level, since valves 68 and 70 will periodically open thereby equalizing the pressure levels within receiving tank 60 and condensate tank 26.

FIG. 2 illustrates input tank 12 and pipe 22 being utilized to communicate to receiving tank 20. Louvres 18 are shown disposed in the vertical position over input tank 12, whilst louvres 72 are shown disposed in the closed position over above ground input tank 74. Piston 76 is mechanically linked to louvres 18 and 72 so as to cause one of them to remain open whilst the other is closed, and when pneumatically operated, to reverse their states of closure. Air is introduced into input tank 74 at point 78 having check valve 80 serve the same function as check valve 16. Check valve 82 and pipe 84 are the equivalent to check valve 24 and pipe 22 respectively. Though input tanks 12 and 74 feed receiving unit 20, only one heating tank 38 feeds receiving tank 48.

FIG. 3 illustrates piston 76 and high pressure air line 86. Valves 88, 90, and 92 and 94 are connected to switches, not shown, operable by check valves 24 and 82 so as to reverse the position of piston 76 alternating the state of louvres 18 and 72 when a given check valve 24 or 82 opens venting the compressed air within its associated tank into receiving tank 20.

One of the advantages of the present invention is a solar energy operated energy producing device which simply converts solar energy to compressed air, thereby maximizing the efficient production of the compressed air.

Another advantage of the present invention is an energy accumulating device which is simple in form and is virtually maintenance free.

Still another advantage of the present invention is a solar energy operated power source which yields condensed water as a by-product thereby increasing the usefulness thereof in climates devoid of local water sources.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

I claim:

1. A solar energy operated air compressor and condenser comprising at least two tanks, said at least two tanks being disposed above the grade of the earth and to the sun's rays, a first receiving tank, said first receiving tank being disposed below said grade and shilded from said sun's rays, means to alternately shield each of said at least two tanks from said sun's rays, first means to communicate compressed air from within said each of said at least two tanks to within said first receiving tank when the pressure level within said each of said at least two tanks exceeds the pressure level within said first receiving tank, a condensate tank, said condensate tank being disposed below said grade, first means to drain condensate water from said first receiving tank into said condensate tank when said condensate water reaches a pre-determined level within said first receiving tank, a first heating tank, said first heating tank being disposed above said grade and to said sun's rays, second means to communicate compressed air from within said first receiving tank to within said first heating tank when said pressure level within said first receiving tank exceeds the pressure level within said first heating tank, a second receiving tank, said second receiving tank being disposed below said grade and shielded from said sun's rays, third means to communicate said compressed air within said first heating tank to within said second receiving tank when said pressure level within said first heating tank exceeds the pressure level within said second receiving tank, second means to drain condensate water from said second receiving tank into said condensate tank when said condensate water within said second receiving tank reaches a pre-determined height within said second receiving tank, means to supply atmospheric air to within said each of said at least two tanks.

2. The solar energy operated air compressor and condenser as claimed in claim 1 further comprising an additional plurality of receiving tanks, an additional plurality of heating tanks, said additional plurality of heating tanks being disposed in a series pneumatic circuit with said additional plurality of receiving tanks, each of said additional plurality of heating tanks being interposed pneumatically communicating between adjacent pairs of said additional plurality of receiving tanks.

3. The solar energy operated air compressor and condenser as claimed in claim 1 wherein said first means comprises a pipe, said pipe communicating from one of said at least two tanks to said first receiving tank, a check valve, said check valve being interposed between the ends of said pipe.

4. The solar energy operated air compressor and condenser as claimed in claim 3 wherein said alternate shielding means comprises a piston, a plurality of louvres, said each of said at least two tanks having one of said plurality of louvres disposed intermediate said sun's rays and said each of said at least two tanks, means to link the shaft of said piston to said one of said plurality of louvres, means to operate said piston responsive to the opening of said check valve, said means to link including said one of said plurality of louvres being disposed in a shielding position shielding said one of said at least two tanks from said sun's rays when said check valve is in an open position.

5. The solar energy operated air compressor and condenser as claimed in claim 1 wherein said first means to drain comprises a float switch being disposed within said first receiving tank, said float switch being responsive to said pre-determined level within said first receiving tank, means to operate said water valve when said float switch responds to said pre-determined level, a drain pipe fluidly communicating from said first receiving tank to said condensate tank, said water valve being disposed intermediate the ends of said drain pipe.

6. The solar energy operated air compressor and condenser as claimed in claim 1 wherein said second means to communicate comprises a pipe communicating from said first receiving tank to said first heating tank, a check valve being disposed intermediate the ends of said pipe.

7. The solar energy operated air compressor and condenser as claimed in claim 1 wherein said third means to communicate comprises a pipe communicating from said first heating tank to said second receiving tank, a check valve being disposed intermediate the ends of said pipe.

8. The solar energy operated air compressor and condenser as claimed in claim 1 wherein said second means to drain comprises a float switch being disposed within said second receiving tank, said float switch being responsive to said pre-determined height within said second receiving tank, means to operate said water valve when said float switch responds to said pre-determined height, a drain pipe fluidly communicating from said second receiving tank to said condensate tank, said water valve being disposed intermediate the ends of said drain pipe.

9. The solar energy operated air compressor and condenser as claimed in claim 1 wherein said means to supply comprises a pipe, a check valve, said pipe having one end thereof communicating to said atmospheric air, the other end of said pipe communicating to the interior of one of said at least two tanks, said check valve being disposed said one end and said other end of said pipe.

* * * * *